United States Patent
Tanaka

(10) Patent No.: US 9,258,284 B2
(45) Date of Patent: Feb. 9, 2016

(54) SERVER, METHOD OF GROUP KEY NOTIFICATION AND PROGRAM

(71) Applicant: KABUSHIKI KAISHA TOSHIBA, Minato-ku, Tokyo (JP)

(72) Inventor: Yasuyuki Tanaka, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/168,353

(22) Filed: Jan. 30, 2014

(65) Prior Publication Data

US 2014/0215215 A1 Jul. 31, 2014

(30) Foreign Application Priority Data

Jan. 31, 2013 (JP) ................................ 2013-017895

(51) Int. Cl.
 *H04L 29/06* (2006.01)
(52) U.S. Cl.
 CPC .............. *H04L 63/061* (2013.01); *H04L 63/065* (2013.01); *H04L 63/0846* (2013.01); *H04L 63/104* (2013.01)
(58) Field of Classification Search
 CPC ...................................................... H04L 63/061
 USPC ........................................................ 713/171
 See application file for complete search history.

(56) References Cited

U.S. PATENT DOCUMENTS

| 7,685,422 B2 * | 3/2010 | Isozaki et al. ................. 713/171 |
| 2010/0008509 A1 * | 1/2010 | Matsushita et al. ........... 380/279 |
| 2012/0257755 A1 * | 10/2012 | Ge et al. ........................ 380/278 |
| 2013/0067214 A1 | 3/2013 | Tanaka et al. |

FOREIGN PATENT DOCUMENTS

JP 2005-159780 A 6/2005

OTHER PUBLICATIONS

"Toward a National Public Key Infrastructure"; S Chokhani—Communications Magazine, IEEE, 1994; 5 pages.*

* cited by examiner

*Primary Examiner* — Jason Lee
(74) *Attorney, Agent, or Firm* — Ohlandt, Greeley, Ruggiero & Perle, LLP

(57) ABSTRACT

According to one embodiment, a server includes a message communicator, a key information storage, and a key controller. The message communicator is configured to communicate a message to a client. The key information storage is configured to store key information including at least a key value being value of key, a validity term of key, and assignment information of key. The key controller is configured to generate a key notification message including a key value of the client and a key update time when the message communicator receives a key request message from an authenticated client. The key value is corresponding with the assignment of the key information. The key update time decides from the validity term of the key and a validity term of authentication succeeded state of the client. The message communicator transmits the key notification message to the client.

7 Claims, 13 Drawing Sheets

| Client-ID | Pre-shared key | Validity term of authentication succeeded status |
|---|---|---|
| client102@example.com | 9q#AFnBB | 2012/7/10 18:00 |
| client103@example.com | p0AAjpruwz | 2012/7/12 18:05 |
| client104@example.com | 9z83nmd.d | 2012/7/10/ 20:00 |
| client05@example.com | 634#$Qdkba | - |

Fig.8

| Key-ID | Key value | Validity term | Key assignment |
|---|---|---|---|
| 1001 | 120ajBAj43anb | 2012/7/10 12:15 | Group1 (Client102,Client104) |
| 1002 | 0AXXbajoea09 | 2012/7/11 3:10 | Group2 (Client104,Client105) |
| 1003 | 9da9aQQpaie | 2012/7/9 20:20 | Group1 (Client102,Client104) |
| 1010 | mma45313lqo | 2012/7/12 18:05 | Client103 |

Fig.9

| Client-ID | Pre-Shared Key | Validity term of authentication succeeded status | Address Information of Client |
|---|---|---|---|
| client102@example.com | 9q#AFnBB | 2012/7/10 18:00 | Latitude xxx, Longitude yyy |
| client103@example.com | p0AAjpruwz | 2012/7/12 18:05 | Latitude aaa, Longitude bbb |
| client104@example.com | 9z83nmd.d | 2012/7/10 20:00 | Latitude zzz, Longitude sss |
| client05@example.com | 634#$Qdkba | - | Latitude hhh, Longitude www |

Fig.12

SERVER, METHOD OF GROUP KEY NOTIFICATION AND PROGRAM

CROSS-REFERENCE TO RELATED APPLICATIONS

This application is based upon and claims the benefit of priority from Japanese Patent Application No. 2013-17895, filed Jan. 31, 2013; the entire contents of which are incorporated herein by reference.

FIELD

Embodiments described herein relate generally to a server which distributes keys, method of group key notification and program.

BACKGROUND

A server which distributes keys currently notifies new keys every time a node joins or leaves the group. However, the key notification occurs frequently in an environment which the node frequently joins or leaves, e.g. wireless mesh network, traffic increase in network and dead or life confirmation of the node occurs increase of traffic, too.

BRIEF DESCRIPTION OF THE DRAWINGS

FIG. 8 is a diagram showing client information;
FIG. 9 is a diagram showing key information;
FIG. 12 is a diagram showing client information.

DETAILED DESCRIPTION

In general, according to one embodiment, a server includes a message communicator, a key information storage, and a key controller. The message communicator is configured to communicate a message to a client. The key information storage is configured to store key information including at least a key value being value of key, a validity term of key, and assignment information of key. The key controller is configured to generate a key notification message including a key value of the client and a key update time when the message communicator receives a key request message from an authenticated client. The key value is corresponding with the assignment of the key information. The key update time decides from the validity term of the key and a validity term of authentication succeeded state of the client. The message communicator transmits the key notification message to the client.

Embodiments will be described hereinafter with reference to drawings.

First Embodiment

Figure 1:
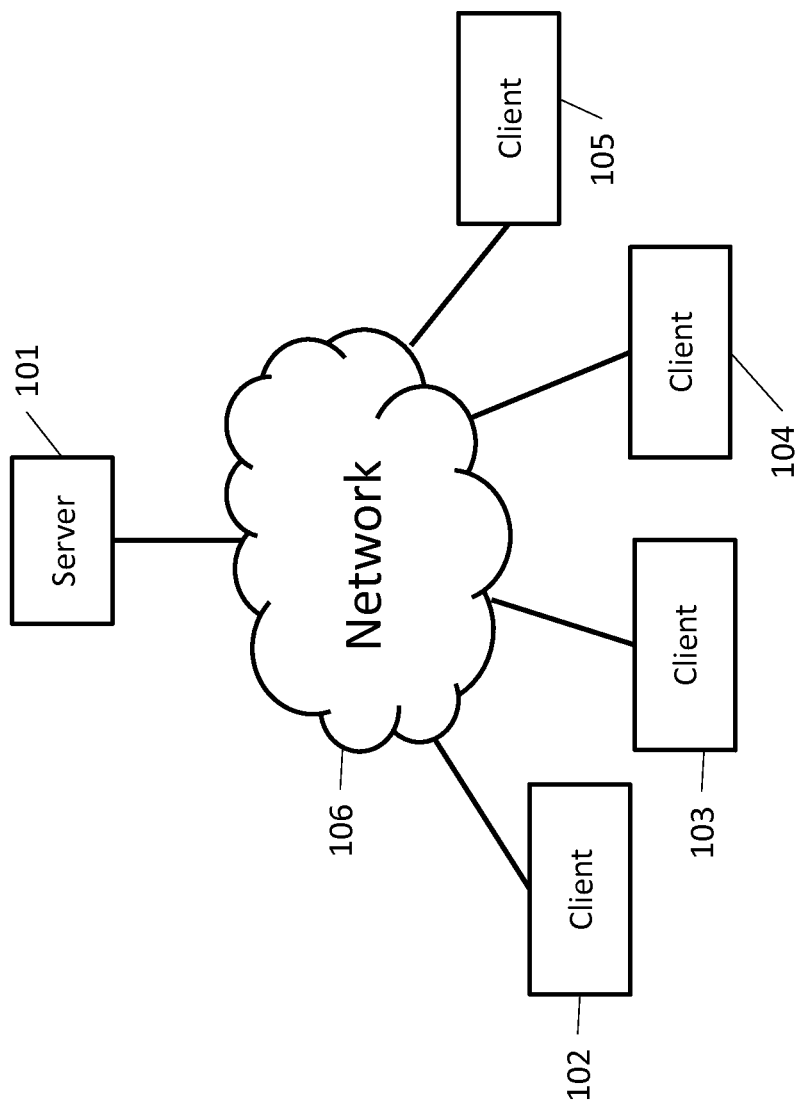
FIG. 1 is a diagram showing the network configuration according to one of embodiment.

FIG. 1 shows network configuration according to one of embodiment. A server 101, a client 102, a client 103, a client 104, and a client 105 are connected to a network 106. The server 101 and each client can communicate via the network 106. The communication node which is directly unrelated to this embodiment is omitted in the figure. In this embodiment, although use of Protocol for Carrying Authentication for Network Access (PANA) is assumed as communication protocol, such as authentication processing, not only this but the communication protocol may be IEEE 802.1X, IEEE 802.11i, etc., for example.

When the client 102-105 connects to the network 106, it executes authentication processing between itself and the server 101 and obtains a group key from the server 101.

When these clients 102-105 establish connection to the network 106, network access authentication processing is executed between the server 101 and the clients (102-105). The client 102-105 directly executes network access authentication between itself and the server 101. Although not shown in FIG. 1, another client may execute network access authentication between itself and the server 101 via either of the clients 102-105. Thus, another client may use either of the clients 102-105 as an authentication relay and may execute network access authentication processing between itself and the server 101. The client 102-105 cannot establish connection to the network 106 unless network access authentication succeeds.

Figure 2:
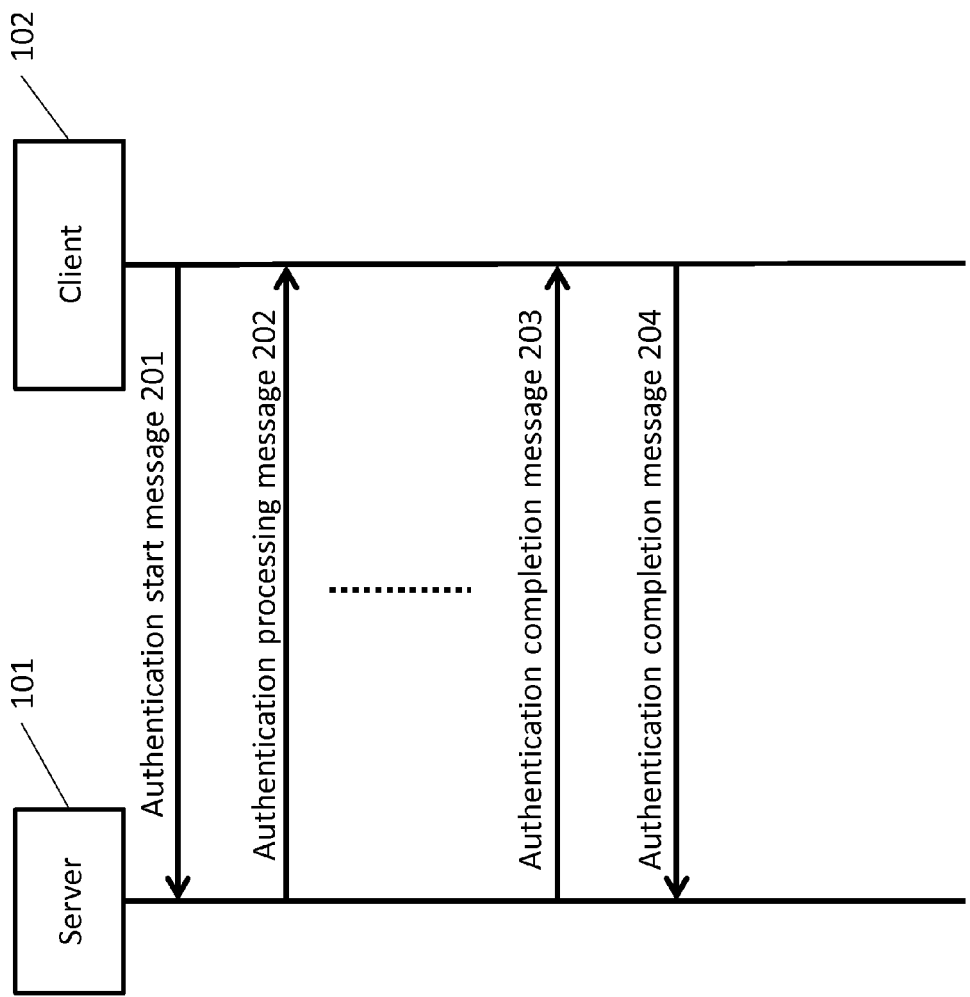
FIG. 2 is a message sequence chart showing one mode of network access authentication.

FIG. 2 shows a message sequence of the authentication processing executed between the server 101 and the client 102. Initially, the client 102 transmits an authentication start message 201 to the server 101, and starts network access authentication processing. The server 101 which received the authentication start message 202 transmits an authenticating processing message 202 to the client 102. Then, it executes authentication processing according to a predetermined authentic method. Lastly, the server 101 transmits an authentication completion message 203 to the client 102, and the client 102 transmits an authentication completion message 204 as a response to the server 101. This embodiment shows an example which the authentication processing starts by the authentication start message 201. However, the authentication processing may start without the authentication start message by the server 101 transmitting the authentication processing message 202 to the client 102. The authentication processing between the server 101 and the client 102 may be mediated by a proxy server or a relay node.

In this way, when the client establishes connection to the network 106, it operates as an authentication client. Thus, network access authentication processing between the client 102-105 and the server 101 is executed. Note that a network access authentication state has a validity period, and re-authentication processing is often executed before the validity period is expired. At the time of the re-authentication processing, the client also operates as the authentication client. In addition, when the client 102 make a communication associated with its own session, it operates as the authentication client.

When another client (not shown in FIG. 1) establishes connection to the network 106 via the client 102 (may be either of 103-105), the network access authentication processing has to be executed between the server 101 and itself, and this authentication has to succeed. At this time, the client 102 (may be either of 103-105) operates as the authentication relay, and relays a message between the server 101 and another client.

When the authentication in a predetermined method succeeds between the server 101 and the client 102, key information is notified to the client 102 by the authentication completion message 203 from the server 101.

Figure 3:
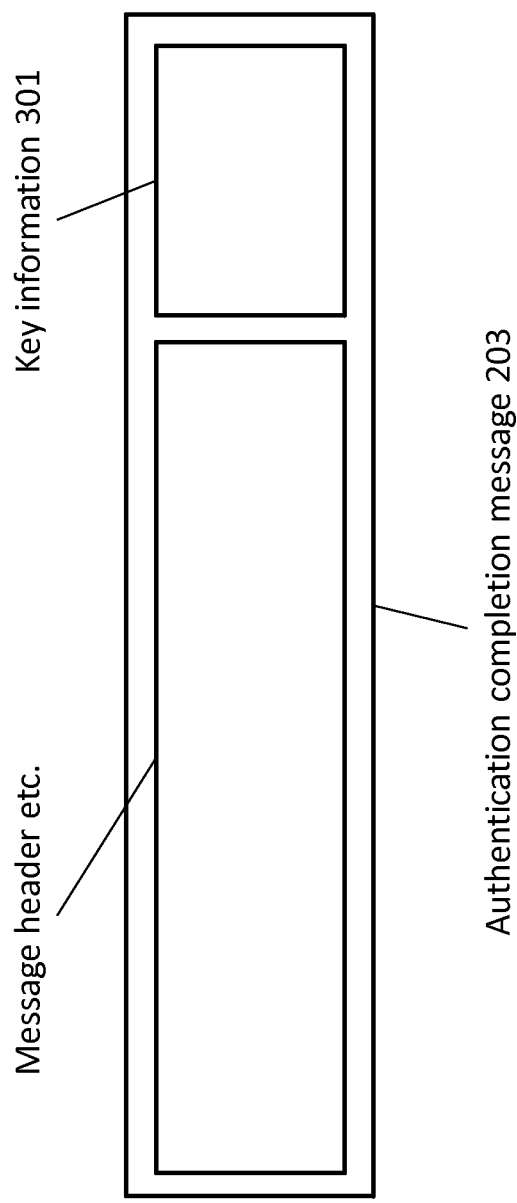
FIG. 3 is a diagram showing an authentication completion message.

FIG. 3 shows an example of the authentication completion message 203 including the key information 301. The key information 301 includes at least a value of a key and a specified update time, the specified update time shows a specified time which executes update processing of the key. The value of key may have various forms and length according to a utilization of key. The server 101 specifies time which executes the update processing for the client 102. In addition, the key information may include a key identifier (key-ID), a key scope, or a validity period of key. When the validity period of key is not included, the specified update time may be used as of the validity period of key.

Figure 4:
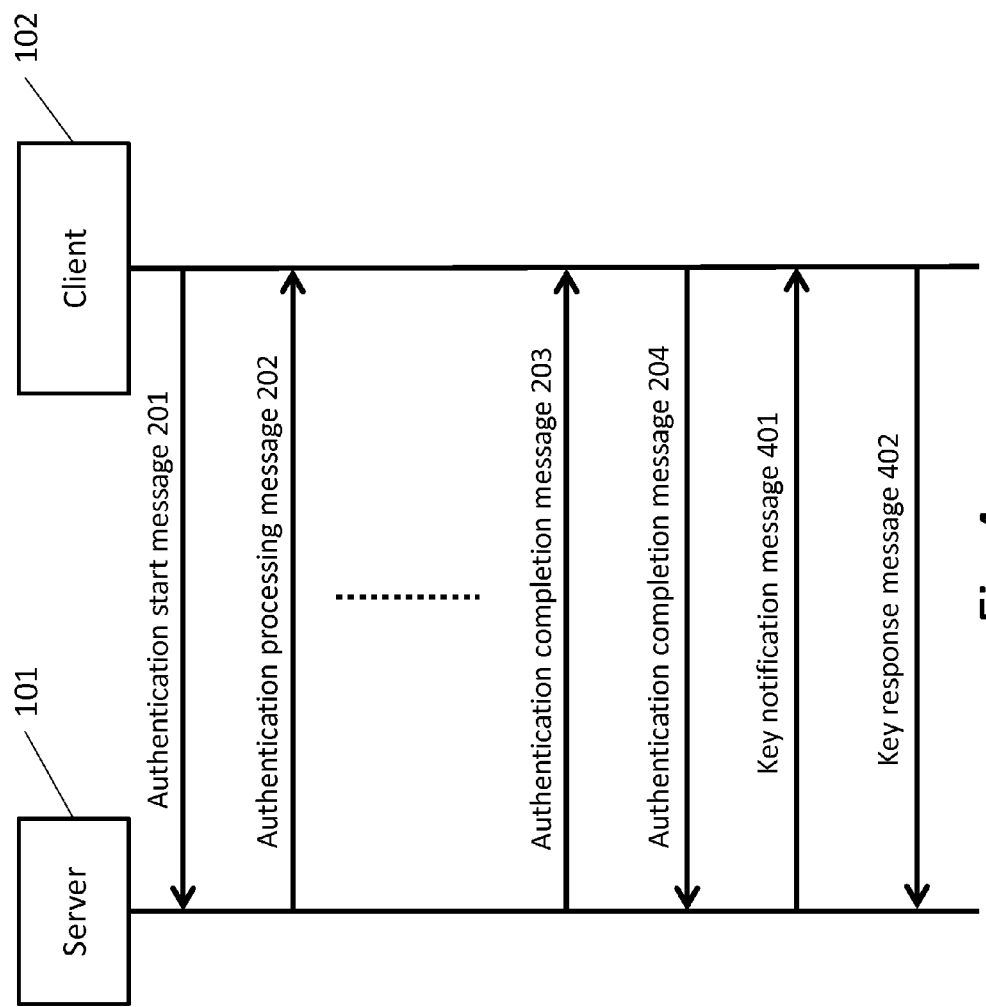
FIG. 4 is a sequence chart in case of key notification after authentication process completion.

The key information 301 does not necessarily need to be notified to the client 102 from the server 101 as the authentication completion message 203. Specifically, the server 101 may notify the key information 301 to the client 102 by a key notification message 401 including the key information 301 as shown in FIG. 4.

Figure 5:
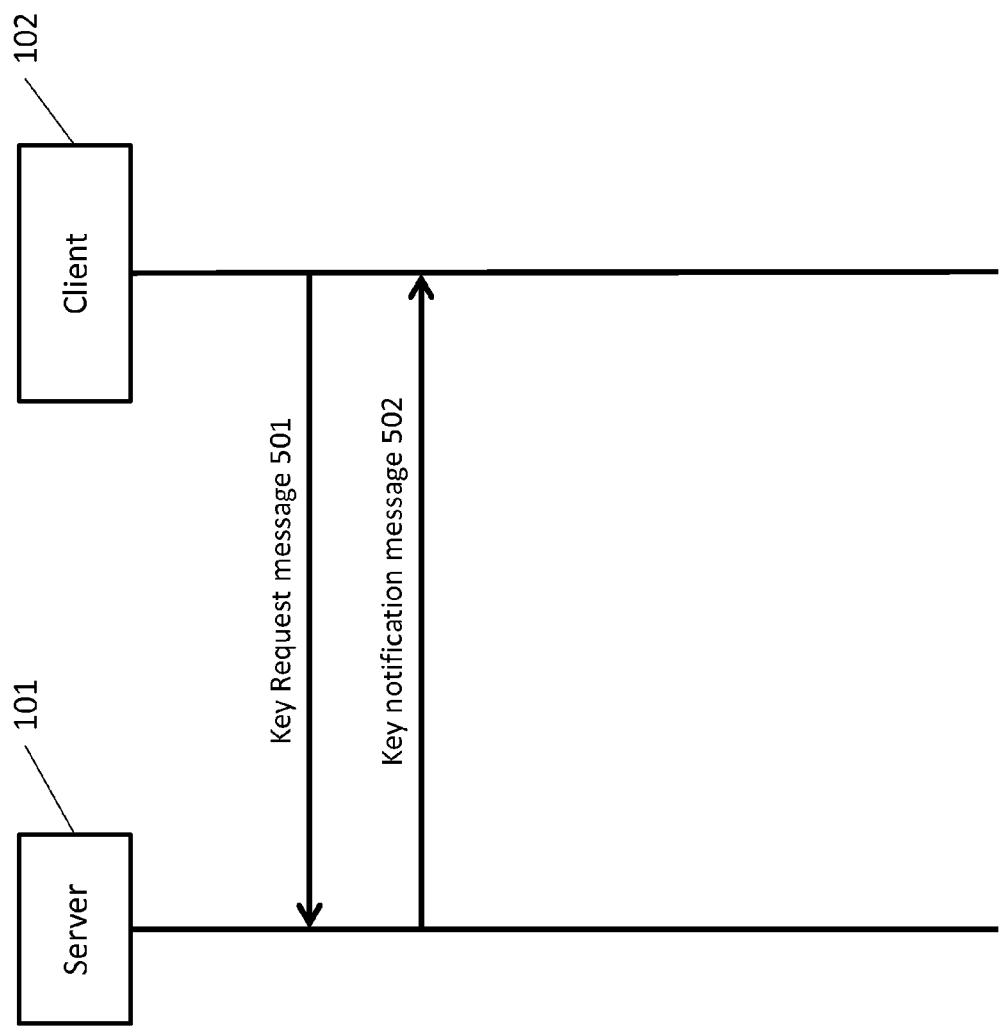
FIG. 5 is a sequence chart showing key renewal process according to key request massage.
Figure 6:
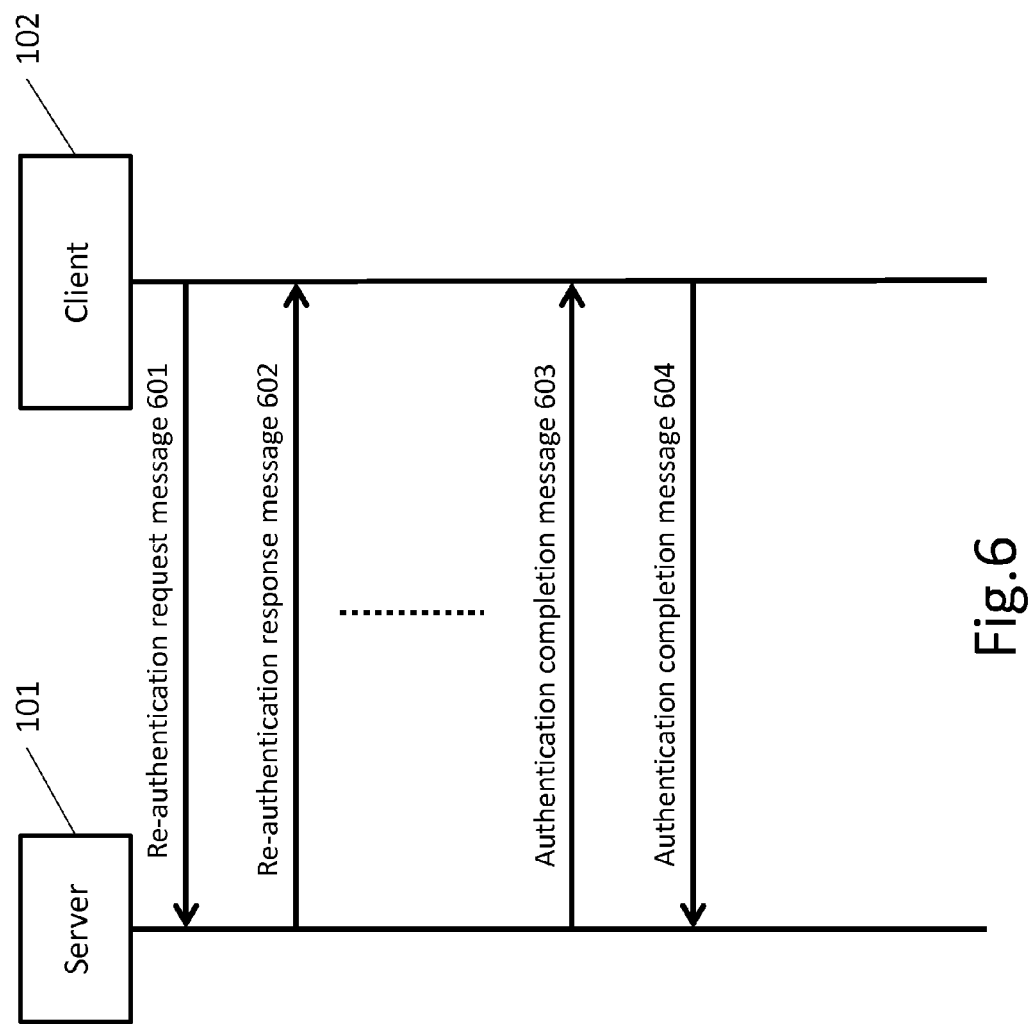
FIG. 6 is a sequence chart showing key renewal process according to re-authentication process.

When the specified update time included in the key information 301 has come, the client 102 starts a key update processing. The key update processing has a method according to a key request message shown in FIG. 5 and a method according to re-authentication processing shown in FIG. 6.

In the method according to the key request message, the client 102 transmits the key request message 501 to the server 101 at the specified update time. The server 101 which received the key request message 501 transmits a key notification message 502 including new key information to the client 102.

In the method according to re-authentication processing, the client 102 transmits a re-authentication processing request message 601 to the server 102 at the specified update time. The server 101 which received the re-authentication processing request message 601 transmits a re-authentication processing response message 602 to the client 102, and starts re-authentication processing.

When the authentication in a predetermined method succeeds between the server 101 and the client 102, new key information is notified to the client 102 by the authentication completion message 603 from the server 101.

Figure 7:
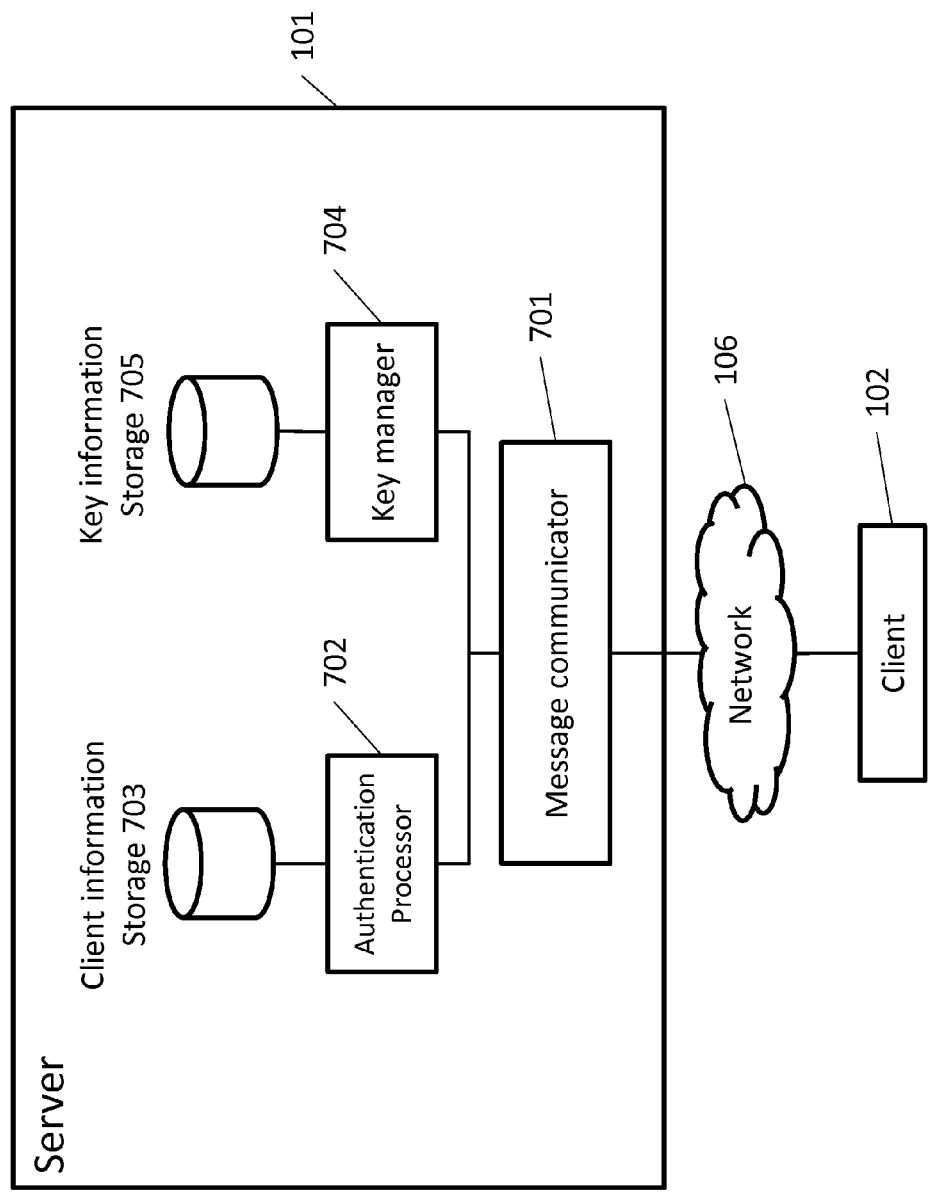
FIG. 7 is a diagram showing the server according to one of embodiment.

FIG. 7 is a diagram showing the server 101. The server 101 includes a message communicator 701, an authentication processor 702, a client information storage 703, a key manager 704, and a key information storage 705.

The message communicator 701 receives a message transmitted from the client 102 (may be either of 103-105), and transmits a message to client 102.

The authentication processor 702 executes an authentication of the client by a predetermined authentication method. The client information storage 703 stores client information required for the authentication of the client, for example, information required to verify authenticity of the client. The client information stored in the client information storage 703 includes information required to verify a pre-shared key or a client certificate etc, in addition to at least an identifier of the client (client-ID). Thus, the authentication processor 702 authenticates whether the client which transmitted the authentication processing request message is authenticity from the authentication processing request message and the client information, the authentication processing request transmitted being transmitted from the client, the client information storing in the client information storage 703. FIG. 8 shows an example of the client information stored in the client information storage 703. In this example, the client information storage 703 stores a client identifier (client-ID), a pre-shared key, and validity periods of authentication succeed state of the client. However, information required to verify authenticity and current information of authentication succeed state may be stored in another storage.

The key manager 704 manages the key information notified to the client. Specifically, it generates a key, cancels a key of expired validity period, executes an assignment of a key to the client or a group, and executes notification processing of a key etc. The key information notified to the client is stored in the key information storage 705. The key information stored in the key information storage 705 includes at least the value of key, the validity period of key and the assignment information of key.

In addition, the key information stored in the key information storage 705 may include the key identifier for identifying a key.

FIG. 9 shows an example of the key information stored in the key information storage 705. In this example, the key information storage 705 stores the key identifier for identifying key, the key value being value of key, the validity period of key, and the assignment information of key. The assignment information may be a group or each individual client. When the group is specified as the assignment information, a client composition of the group is also stored in this example, however the client composition of the group may be stored as another information.

Figure 10:
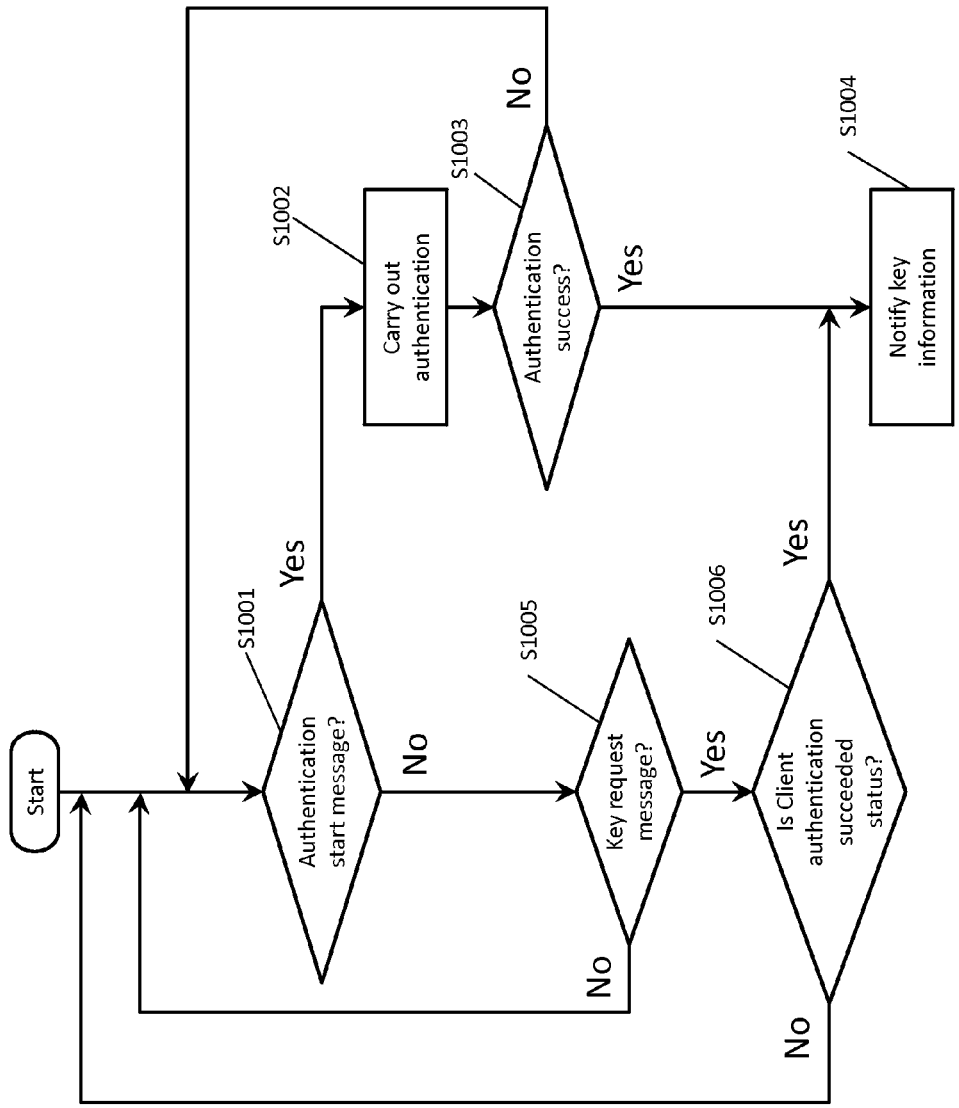
FIG. 10 is a flowchart showing the process sequence of the server.

FIG. 10 is a flowchart shown a process sequence of the server 101. When the server 101 receives an authentication start message from client 102 etc. (S1001/Yes), it executes an authentication processing between itself and the client 102 etc. (S1002). As a result of authentication processing, when an authentication succeeds between the server 101 and the client 102 etc. by a predetermined method (S1003/Yes), the client is in an authentication succeeded state. And the server 101 notifies key information to the client 102 etc. (S1004). On the other hand, as the result of authentication processing when the attestation is failed between the server 101 and the client 102 etc. by the predetermined method, the server 101 is in a state of standing the message from the client (S1003/No).

When the server receives a re-authentication start message from the client (S1001/Yes), it executes an authentication processing between itself and the client like the server receiving authentication start message (S1002).

Then, when the message received from the client 102 etc. is not the authentication message (S1001/No), but is a key request message (S1005/Yes), it confirms whether the client is in the authentication succeeded state (S1006). When the client is in the authentication succeeded state (S1006/Yes), the server 101 notifies a key notification message to the client (S1004). When the key information notified to the client does not exist in the key information storage 705, the server 101 generates a new key by the key manager 704, determines the validity period and a key identifier by the predetermined method, and notifies to the client. The generated new key and its relational information (key information) are stored in the key information storage 705.

When the massage received from the client 102 etc. is neither the authentication start message (S1001/No), nor the key request message (S1005/No), or the client is not in the authentication succeeded status (S1006/No), the server 101 is in a state of standing the message from the client.

The key manager 704 of the server 101 determines a specified update time of key notified to the client from a validity period of the authentication succeeded status and a validity period of key. The key manager 704 acquires the validity period of the authentication succeeded status from the authentication processor 702 based on the client information stored in the client information storage 703, and acquires the t validity period of key from the key information storage 705. When the validity period of the authentication succeeded status is equal or earlier than the validity period of key, the specified update time of key is equal or earlier than the validity period of the authentication succeeded status. When the validity period of key is equal or earlier than the validity period of the authentication succeeded status, the specified update time of key is equal or earlier than the validity period of key.

Thus, the server 102 transmits the key notification message including the specified update time of key to the client transmitted the key request message, hereby the key update time of the client can control, and it can prevent the key update process concentrating for a short term. As a result, the load of the server can be reduced or smoothed.

Second Embodiment

Figure 11:
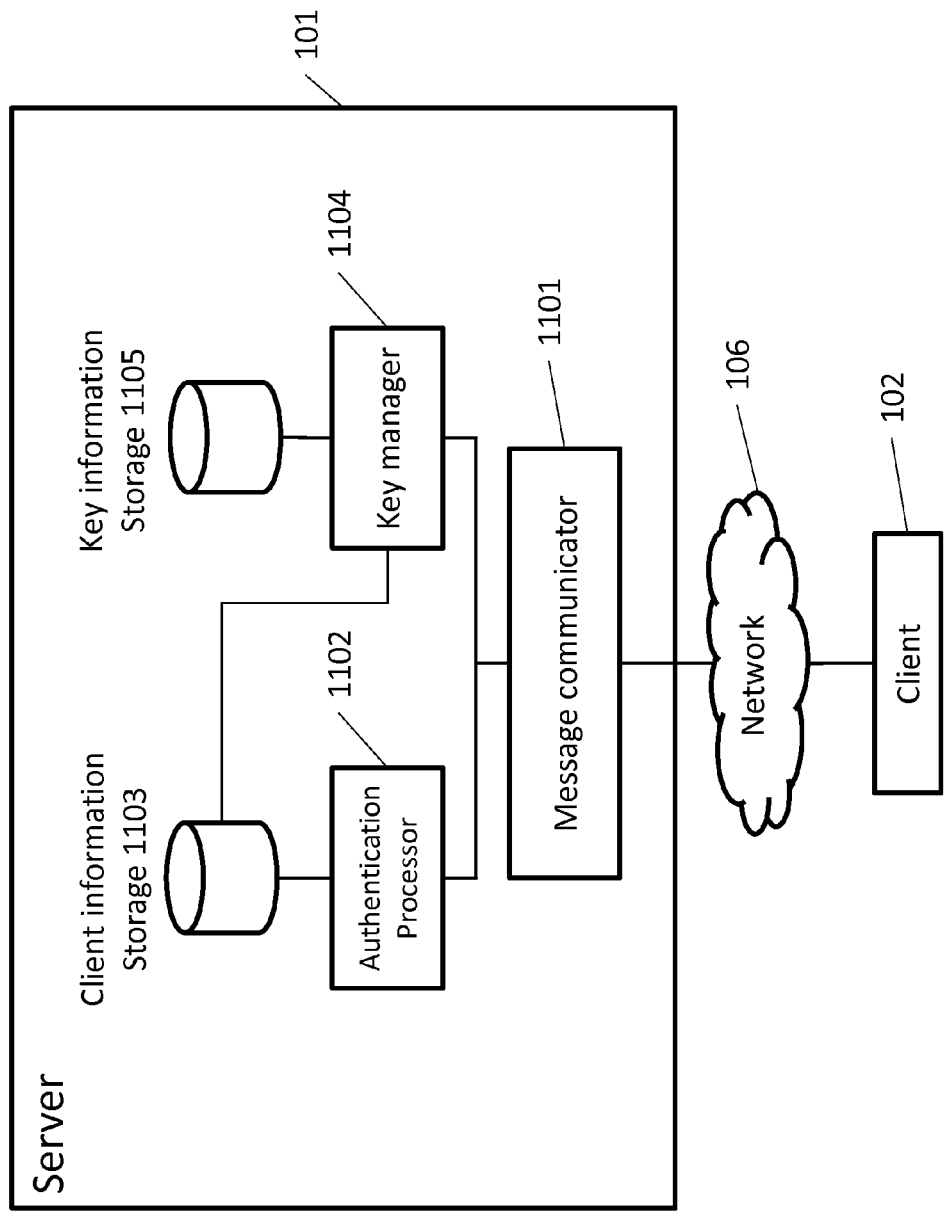
FIG. 11 is a diagram showing the server according to one of embodiment.

The second embodiment is described hereinafter with reference to drawings. FIG. 11 is a diagram showing the server 101. The server 101 includes a message communicator 1101, an authentication processor 1102, a client information storage 1103, a key manager 1104, and a key information storage 1105.

The message communicator 1101 receives a message transmitted from the client 102 (may be either of 103-105), and transmits a message to client 102.

The authentication processor 1102 executes an authentication of the client by a predetermined authentication method. The client information storage 1103 stores client information required for the authentication of the client, for example, information required to verify authenticity of the client. The client information stored in the client information storage 1103 includes at least an identifier of the client (client-ID), in addition to information required to verify a pre-shared key or a client certificate, and address information of the client. The authentication processor 1102 authenticates whether the client which transmitted the authentication processing request message is authenticity from the authentication processing request message and the client information, the authentication processing request transmitted being transmitted from the client, the client information storing in the client information storage 1103.

FIG. 12 shows an example of the client information stored in the client information storage 1103. In this example, the client information storage 703 stores client identifiers (client-ID), pre-shared keys, validity periods of authentication succeed state of the client, and address information. However, information required to verify authenticity and current information of authentication succeed state may be stored in another storage. The address information may be latitude, longitude, or geographical location information like an address, and may be logical location information of IP address etc.

The key manager 1104 manages the key information notified to the client. Specifically, it generates a key, cancels a key of expired validity period, executes an assignment of a key to the client or a group, and executes notification processing of a key etc. The key information notified to the client is stored in the key information storage 1105. The key information stored in the key information storage 1105 includes at least the value of key, the validity period of key and the assignment information of key.

In addition, the key information stored in the key information storage 1105 may include the key identifier for identifying a key.

An example of the key information stored in the key information storage 1105 is same as the first embodiment shown in FIG. 9.

Figure 13:
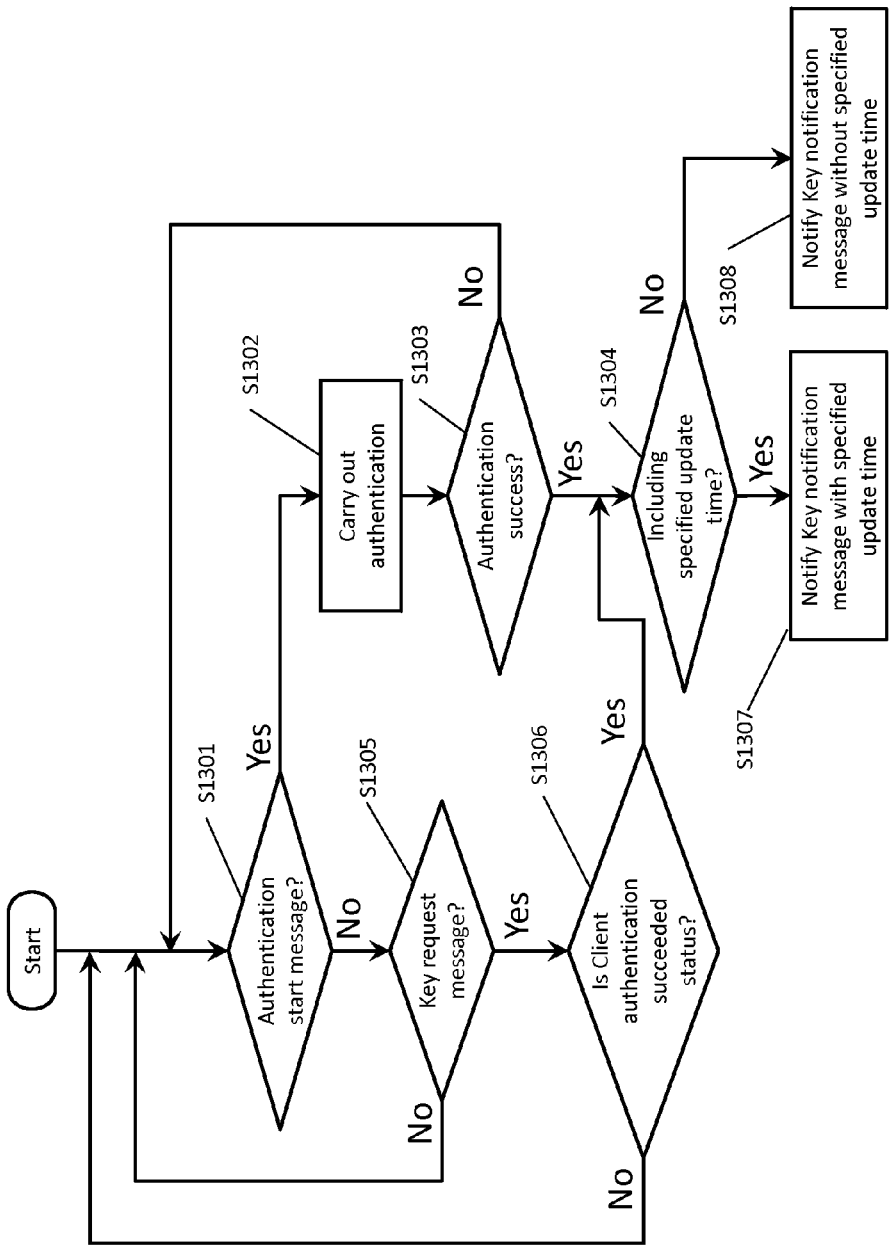
FIG. 13 is a flowchart showing the process sequence of the server.

FIG. 13 is a flowchart shown a process sequence of the server 101. When the server 101 receives an authentication start message from client 102 etc. (S1301/Yes), it executes an authentication processing between itself and the client 102 etc. (S1302). As a result of authentication processing, when an authentication succeeds between the server 101 and the client 102 etc. by a predetermined method (S1303/Yes), the client is in an authentication succeeded state.

The server 101 judges whether a key notification message includes a specified update time from address information, the key notification message being notified to the client, the address information being of the client 102 etc. stored in the client information storage 1103. When a key update processing has influence from the address information (physical location etc.) to the server and the network (S1304/No), the server 101 notifies a key notification message including the specified update time (S1308). On the other hand, when a key update processing does not have influence from the address information (physical location etc.) to the server and the network (S1304/Yes), the server 101 notifies a key notification message without the specified update time (1307).

As the result of authentication processing when the attestation is failed between the server 101 and the client 102 etc. by the predetermined method, the server 101 is in a state of standing the message from the client (S1303/No). When the server receives a re-authentication start message from the client (S1301/Yes), it executes an authentication processing between itself and the client like the server receiving authentication start message (S1302).

Then, the message received from the client 102 etc. is not the authentication message (S1301/No), but is a key request message (S1305/Yes), it confirms whether the client is in the authentication succeeded state (S1306). When the client is in the authentication succeeded state (S1306/Yes), the server 101 judges whether the key notification message includes the specified update time from address information, the key notification message being notified to the client, the address information being of the client 102 etc. stored in the client information storage 1103. When the key update processing has influence from the address information (physical location etc.) to the server and the network (S1304/No), the server 101 notifies the key notification message including the specified update time (S1308). On the other hand, when the key update processing does not have influence from the address information (physical location etc.) to the server and the network (S1304/Yes), the server 101 notifies the key notification message without the specified update time (1307). When the key information notified to the client does not exist in the key information storage 1105, the server 101 generates a new key by the key manager 1104, determines the validity period and a key identifier by the predetermined method, and notifies to the client. The generated new key and its relational information (key information) are stored in the key information storage 1105.

When the massage received from the client 102 etc. is neither the authentication start message (S1301/No), nor the key request message (S1305/No), or the client is not in the authentication succeeded status (S1306/No), the server 101 is in a state of standing the message from the client.

The address information of the client may be stored in the client information storage 1103 in advance, and may be stored in the client information storage 1103 from the address information transmitted from the client, such as an attestation start message.

The key manager 1104 of the server 101 determines a specified update time of key notified to the client from a validity period of the authentication succeeded status and a validity period of key. The key manager 1104 acquires the validity period of the authentication succeeded status from the authentication processor 1102 based on the client information stored in the client information storage 1103, and acquires the validity period of key from the key information storage 1105. When the validity period of the authentication succeeded status is equal or earlier than the validity period of key, the specified update time of key is equal or earlier than the validity period of the authentication succeeded status. When the validity period of key is equal or earlier than the validity period of the authentication succeeded status, the specified update time of key is equal or earlier than the validity period of key.

The server judges whether the key notification message includes the specified update time according to the address information of the client, the client transmitting the key request message, hereby the load of the server can be reduced or smoothed.

Third Embodiment

The third embodiment is described hereinafter. When the client is apparatus of a battery drive and operates intermittently, the server 101 may determine the specified update time in consideration of operation timing, such as intermittent operation of the client and may notify to the client as key information.

The key manager 704 (1104) of the server 101 determines a specified update time of key notified to the client from a validity period of the authentication succeeded status, a validity period of key, and operation timing. The key manager 704 (1104) acquires the validity period of the authentication succeeded status from the authentication processor 702 (1102) based on the client information stored in the client information storage 703 (1103), and acquires the validity period of key from the key information storage 705 (1105). The operation timing may be acquired a timing information stored in the client information storage 703 (1103) in advance, and may be acquired a timing from the authentication start message etc. transmitted by the client. When the operation timing is equal or earlier than the validity period of the authentication succeeded status and the validity period of key, the specified update time of key is a time of the operation timing. When the validity period of the authentication succeeded status or the validity period of key is equal or earlier than the operation timing, and when the validity period of the authentication succeeded status is equal or earlier than the validity period of key, the specified update time of key is equal or earlier than the validity period of the authentication succeeded status. When the validity period of the authentication succeeded status or the validity period of key is equal or earlier than the operation timing, and when the validity period of key is equal or earlier than the validity period of the authentication succeeded status, the specified update time of key is equal or earlier than the validity period of key.

Thus, the server determines the specified update time in consideration of the operation timing of the client, hereby it is possible to make the client into further power saving.

While certain embodiments have been described, these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A server comprising:
a message communicator configured to communicate a message to a client;
a key information storage configured to store information about a key, the information including at least a key value, a first validity term, and assignment information;
a key controller configured to generate a notification message about the key, the notification message including a value of a client key and an update time when the message communicator receives a key request message from an authenticated client, the key value corresponding with the assignment information, the update time deciding from the first validity term and a second validity term of authentication succeeded state of the client;
wherein the message communicator transmits the notification message to the client;
a client information storage configured to store client information having a need to authenticate the client; and
an authenticator configured to authenticate the client from an authentication request message and the client information when the message communicator receives the authentication request message,
wherein the key controller generates the notification message including the key value and the key update time when the message communicator receives the key request message from the authenticated client, the key value corresponding with the assignment information, the update time deciding from the first validity time and the second validity time, wherein the client information includes address information of the client, and
wherein the key controller judges whether to include the update time in the notification message from the address information.

2. The server according to claim 1, wherein the key controller decides on the update time to be an equal or earlier time than the second validity term when the second validity term is equal or earlier than the first validity term.

3. The server according to claim 1, wherein the key controller decides on the update time to be an equal or earlier time than the first validity term when the first validity term is equal or earlier than the second validity term.

4. The server according to claim 2, wherein the key controller decides on the update time to be operation timing when the operation timing of the client is equal or earlier time than the second validity term.

5. The server according to claim 3, wherein the key controller decides on the update time to be operation timing when the operation timing of the client is equal or earlier time than the first validity term.

6. A method of group key notification comprising;
confirming whether a client received an authentication message or not;

generating a notification message about a key, the notification message including a value of a key of the client and an update time when the authentication message was received from the client, the value corresponding with information about the key, the information including at least a key value, a first validity term, and assignment information, the update time deciding from the first validity term and a second validity term of authentication succeeded state of the client;

transmitting the notification message to the client;

authenticating the client from the authentication message and client information when the authentication message is received from an authenticated client;

generating the notification message including the value and the update time when the authentication message is received from the authenticated client, the key value corresponding with the assignment information, the update time deciding from the first validity time and the second validity time, wherein the client information includes address information of the client, and judging whether to include the update time in the notification message from the address information.

7. A computer program product comprising a non transitory computer-readable medium containing a program executed by a computer, the program causing the computer to execute:

confirming whether the client received an authentication message or not;

generating a notification message about a key, the notification message including a value of a key of the client and an update time when the authentication message was received from the client, the value corresponding with information about the key, the information including at least a key value, a first validity term, and assignment information, the update time deciding from the first validity term and a second validity term of authentication succeeded state of the client;

transmitting the notification message to the client;

authenticating the client from the authentication message and client information when the authentication message is received from an authenticated client;

generating the notification message including the value and the update time when the authentication message is received from the authenticated client, the key value corresponding with the assignment information, the update time deciding from the first validity time and the second validity time, wherein the client information includes address information of the client, and judging whether to include the update time in the notification message from the address information.

* * * * *